US012124630B2

(12) United States Patent
Nakagawa et al.

(10) Patent No.: US 12,124,630 B2
(45) Date of Patent: Oct. 22, 2024

(54) INFORMATION PROCESSING DEVICE

(71) Applicant: Sony Interactive Entertainment Inc., Tokyo (JP)

(72) Inventors: Yusuke Nakagawa, Tokyo (JP); Yukari Konishi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 403 days.

(21) Appl. No.: 17/425,706

(22) PCT Filed: Sep. 10, 2019

(86) PCT No.: PCT/JP2019/035521
§ 371 (c)(1),
(2) Date: Jul. 23, 2021

(87) PCT Pub. No.: WO2020/158036
PCT Pub. Date: Aug. 6, 2020

(65) Prior Publication Data
US 2022/0187916 A1    Jun. 16, 2022

(30) Foreign Application Priority Data

Feb. 1, 2019    (WO) .................. PCT/JP2019/003737

(51) Int. Cl.
*H04B 3/36*      (2006.01)
*A63F 13/285*    (2014.01)
(Continued)

(52) U.S. Cl.
CPC ............ *G06F 3/016* (2013.01); *A63F 13/285* (2014.09); *G06F 3/165* (2013.01); *G06N 20/00* (2019.01)

(58) Field of Classification Search
CPC .......... G06F 3/016; G06F 3/165; G06F 3/167; A63F 13/285; A63F 13/54; G06N 20/00; G06N 3/045; G06N 3/08; H04R 1/00
See application file for complete search history.

(56) References Cited

U.S. PATENT DOCUMENTS 8,378,964 B2 *   2/2013   Ullrich ...................... G06F 3/16
                                               84/645
8,754,757 B1 *   6/2014   Ullrich ..................... G08B 6/00
                                               340/407.1

(Continued)

FOREIGN PATENT DOCUMENTS

| JP | 2010502086 A | 1/2010 |
| JP | 2015053038 A | 3/2015 |
| WO | 2015145893 A1 | 10/2015 |

OTHER PUBLICATIONS

International Preliminary Report on Patentability and Written Opinion for corresponding PCT Application No. PCT/JP2019/035521, 16 pages, dated Aug. 12, 2021.

(Continued)

*Primary Examiner* — Toan N Pham
(74) *Attorney, Agent, or Firm* — Matthew B. Dernier, Esq.

(57) ABSTRACT

An information processing device obtains audio data, obtains, as teacher vibration data, information regarding vibration data used to vibrate a vibrating device, the vibration data being produced on a basis of the audio data, performs machine learning using the audio data and the teacher vibration data as input, and generates learned model data used to convert an audio waveform into a vibration waveform.

11 Claims, 7 Drawing Sheets

(51) Int. Cl.
*G06F 3/01* (2006.01)
*G06F 3/16* (2006.01)
*G06N 20/00* (2019.01)

(56) References Cited

U.S. PATENT DOCUMENTS

| | | | |
|---|---|---|---|
| 9,448,626 | B2* | 9/2016 | Cruz-Hernandez ..... G06F 3/016 |
| 10,449,446 | B2 | 10/2019 | Nakagawa |
| 10,599,218 | B2 | 3/2020 | Saboune |
| 10,691,218 | B2 | 6/2020 | Chan |
| 2009/0189748 | A1 | 7/2009 | Bergere |
| 2012/0206247 | A1* | 8/2012 | Bhatia .................... G06F 3/167 |
| | | | 340/407.1 |
| 2015/0070261 | A1 | 3/2015 | Saboune |
| 2017/0087458 | A1 | 3/2017 | Nakagawa |
| 2019/0247010 | A1 | 8/2019 | Barnacka |

OTHER PUBLICATIONS

International Search Report for corresponding PCT Application No. PCT/JP2019/035521, 4 pages, dated Dec. 17, 2019.
Hiroshibam Kazuyuki, et al., "Acoustic Feature Value Conversion Using Convolutional Neural Networks and Audio Quality Conversion Using Spectrogram Definition Enhancement" Information Processing Society of Japan, IPSJ SIG Technical Report, vol. 2018-MUS-119, No. 27, vol. 2018-SLP-122, No. 27, Jun. 16, 2018 (for relevancy see International Search Report for corresponding PCT Application No. PCT/JP2019/035521).
Notice of Reasons for Refusal for corresponding JP Application No. 2020-569356, 8 pages, dated May 27, 2022.
Kazuyuki Hiroshiba, "Foldable neural networks Voice quality conversion by using acoustic characteristic quantity conversion and spectrogram high definition, voice language information processing", Information Processing Society, 6 pages, Jun. 9, 2018.
Notice of Allowance for related application U.S. Appl. No. 17/918,949, 8 pages, dated Aug. 29, 2024.

* cited by examiner

INFORMATION PROCESSING DEVICE

TECHNICAL FIELD

The present invention relates to an information processing device, an information processing method, a program, and learned model data for generating a vibration waveform for vibrating a vibrating device.

BACKGROUND ART

A vibrating device that transmits vibration to a user is used with an objective of enhancing a sense of realism in a computer game, for example. A vibration can be presented to the user by operating such a vibrating device in a state in which the user grasps or wears the vibrating device.

SUMMARY

Technical Problems

In order to operate the vibrating device, required is vibration waveform data which specifies a waveform with which to actually vibrate an internal vibrating mechanism. Conventionally, a producer manually produces such vibration waveform data, and therefore the producer needs to specify in detail the waveform shape of vibration and various kinds of parameters. In addition, it is not necessarily clear what kind of vibration waveform is to/should be generated according to a vibration desired to be presented to the user, so that trial and error is necessary. Thus, it takes time and effort to produce the vibration waveform data according to a purpose.

The present invention has been made in view of the above-described actual situation. It is one of objects of the present invention to provide an information processing device, an information processing method, a program, and learned model data that make it possible to generate vibration waveform data for vibrating a vibrating device with relatively little time and effort.

Solution to Problems

An information processing device according to one aspect of the present invention includes an audio data obtaining section configured to obtain audio data, a teacher vibration data obtaining section configured to obtain, as teacher vibration data, information regarding vibration data used to vibrate a vibrating device, the vibration data being produced on the basis of the audio data, and a machine learning section configured to perform machine learning using the audio data and the teacher vibration data as input, and generate learned model data used to convert an audio waveform into a vibration waveform.

An information processing method according to one aspect of the present invention includes a step of obtaining audio data, a step of obtaining, as teacher vibration data, information regarding vibration data used to vibrate a vibrating device, the vibration data being produced on the basis of the audio data, and a step of performing machine learning using the audio data and the teacher vibration data as input, and generating learned model data used to convert an audio waveform into a vibration waveform.

A program according to one aspect of the present invention is a program causing a computer to execute a step of obtaining audio data, a step of obtaining, as teacher vibration data, information regarding vibration data used to vibrate a vibrating device, the vibration data being produced on the basis of the audio data, and a step of performing machine learning using the audio data and the teacher vibration data as input, and generating learned model data used to convert an audio waveform into a vibration waveform. This program may be provided in a state of being stored on a computer readable and non-transitory information storage medium.

Learned model data according to one aspect of the present invention is learned model data used to convert an audio waveform into a vibration waveform, the learned model data being obtained as a result of performing machine learning using audio data and teacher vibration data as input, the teacher vibration data being information regarding vibration data used to vibrate a vibrating device, the vibration data being produced on the basis of the audio data.

An information processing device according to one aspect of the present invention includes a target audio data obtaining section configured to obtain target audio data to be processed, and a vibration data generating section configured to generate vibration data for vibrating a vibrating device by converting the target audio data into a vibration waveform by using learned model data obtained as a result of performing machine learning using audio data and teacher vibration data as input, the teacher vibration data being information regarding vibration data used to vibrate the vibrating device, the vibration data being produced on the basis of the audio data.

DESCRIPTION OF EMBODIMENT

An embodiment of the present invention will hereinafter be described in detail with reference to the drawings.

Figure 1:
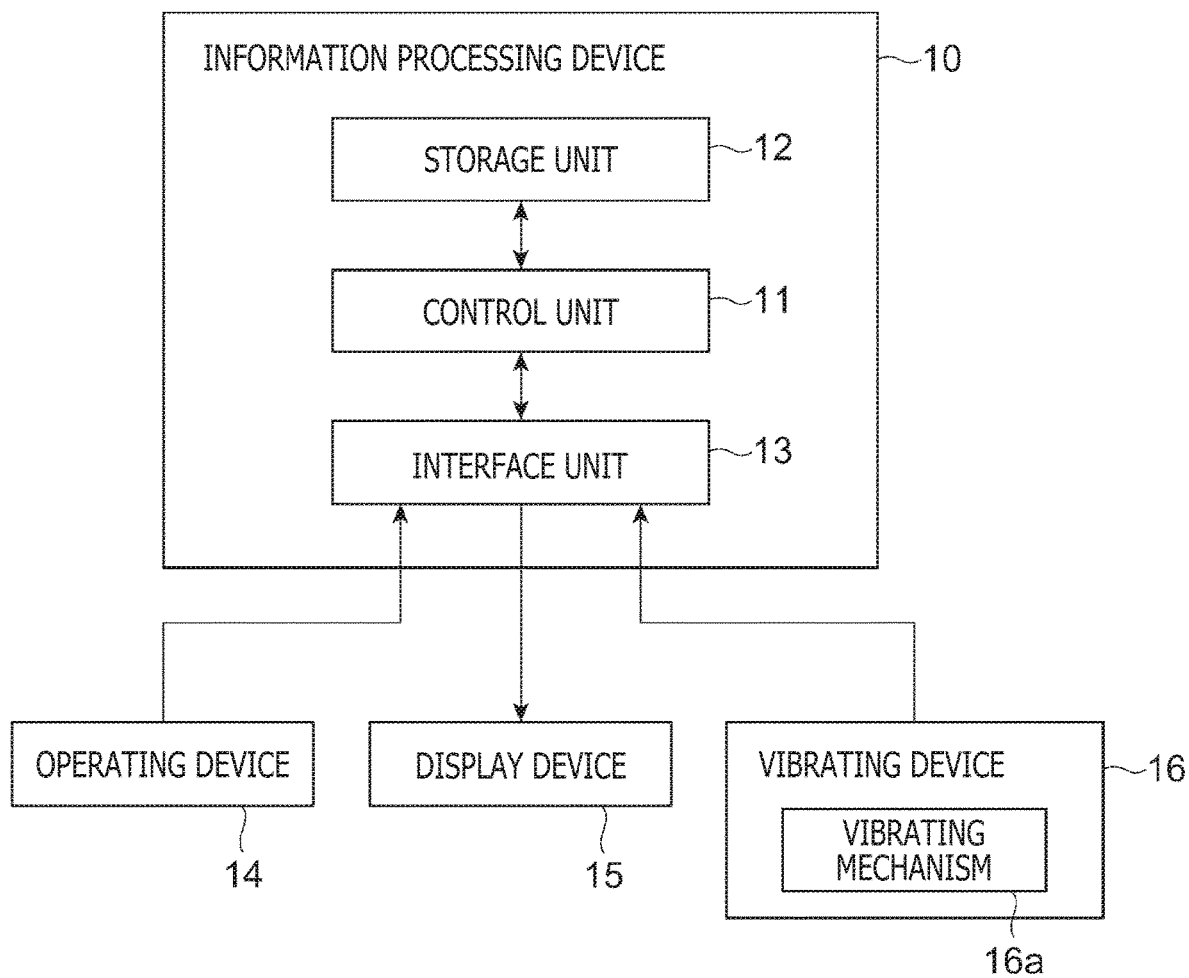
FIG. 1 is a configuration block diagram of an information processing system including an information processing device as an information processing device according to an embodiment of the present invention.

FIG. 1 is a configuration block diagram of an information processing device 10 according to one embodiment of the present invention. The information processing device 10 is a personal computer or another information processing device. As illustrated in FIG. 1, the information processing device 10 includes a control unit 11, a storage unit 12, and an interface unit 13. In addition, the information processing device 10 is connected to an operating device 14, a display device 15, and a vibrating device 16.

The control unit 11 includes at least one processor such as a CPU (Central Processing Unit). The control unit 11 performs various kinds of information processing by executing a program stored in the storage unit 12. Incidentally, a concrete example of the processing performed by the control unit 11 in the present embodiment will be described later. The storage unit 12 includes at least one memory device such as a RAM. The storage unit 12 stores the program executed by the control unit 11 and data processed by the program.

The interface unit 13 is an interface for data communication with the operating device 14, the display device 15, and the vibrating device 16. The information processing device 10 is connected to each of the operating device 14, the display device 15, and the vibrating device 16 via the interface unit 13 either by wire or by radio. Specifically, suppose that the interface unit 13 includes an HDMI (registered trademark) (High-Definition Multimedia Interface) or another multimedia interface to transmit video data supplied by the information processing device 10 to the display device 15. In addition, a USB (Universal Serial Bus) or another data communication interface is included to receive an operation signal indicating the content of a user operation received by the operating device 14 and transmit a control signal for vibrating the vibrating device 16.

The operating device 14 is a device that receives an operation instruction from a user and transmits an operation signal indicating the content of the operation instruction to the information processing device 10. The operating device 14 may, for example, include a keyboard, a mouse, and the like. The display device 15 displays video corresponding to a video signal transmitted from the information processing device 10 to allow the user to view the video.

The vibrating device 16 is a device used to present a vibration to the user. The vibrating device 16 includes a vibrating mechanism 16a. The vibrating device 16 vibrates the vibrating mechanism 16a according to the control signal received from the information processing device 10. A vibration is thereby presented to the user having the vibrating device 16. The vibrating mechanism 16a may generate the vibration by various kinds of systems such as an eccentric motor (ERM (Eccentric Rotating Mass)), a voice coil motor, a linear resonant actuator, and a piezoelectric actuator. In addition, the vibrating device 16 may include a plurality of vibrating mechanisms 16a.

Figure 2:
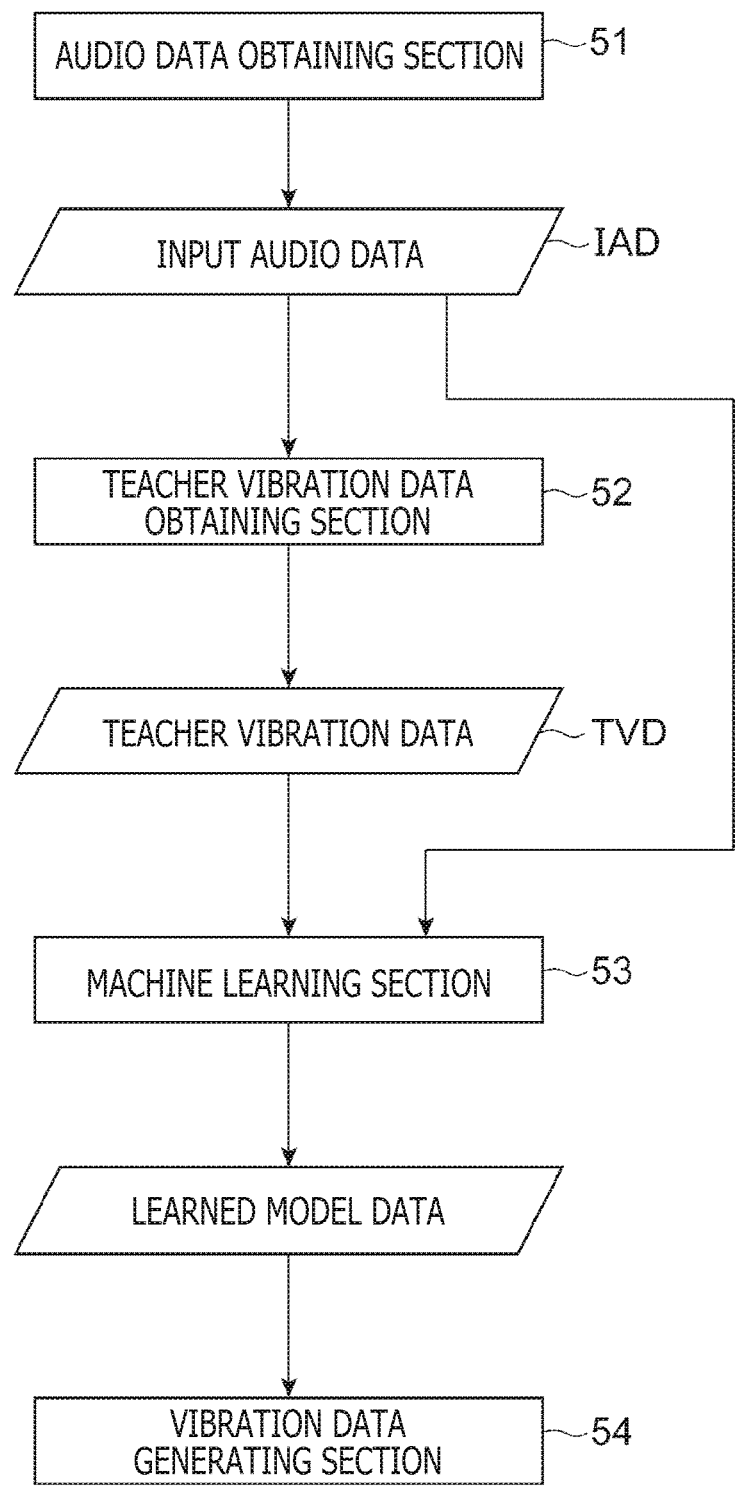
FIG. 2 is a functional block diagram of the information processing device.

Functions implemented by the information processing device 10 will next be described with reference to FIG. 2. The information processing device 10 is used to generate vibration waveform data on the basis of audio data. As illustrated in FIG. 2, the information processing device 10 functionally includes an audio data obtaining section 51, a teacher vibration data obtaining section 52, a machine learning section 53, and a vibration data generating section 54. These functions are implemented by the control unit 11 by executing the program stored in the storage unit 12. This program may be provided to the information processing device 10 via a communication network such as the Internet, or may be provided in a state of being stored on a computer readable information storage medium such as an optical disk.

The audio data obtaining section 51 obtains audio data serving as original data for generating vibration data. In the following, the audio data obtained by the audio data obtaining section 51 will be written as input audio data IAD. The input audio data IAD is data representing the waveform of sound. In general, in a case where a vibration is presented to the user, sound such as a sound effect is reproduced in the same timing. Accordingly, the vibration data can be generated efficiently by using, as the original data, the input audio data IAD that represents the waveform of the sound reproduced together with such a vibration.

The audio data obtaining section 51 obtains a plurality of pieces of audio data to be used as sample data (input data) in machine learning to be described later. Incidentally, in order to increase the number of pieces of sample data (data augmentation), the audio data obtaining section 51 may obtain data as other input audio data IAD by applying audio signal processing such as a pitch shift, a time shift, normalization, and equalization to one piece of input audio data IAD input externally.

The teacher vibration data obtaining section 52 obtains teacher vibration data TVD to be used as teacher data in machine learning to be described later. The teacher vibration data TVD is data representing a vibration waveform for vibrating the vibrating mechanism 16a. Specifically, for each of a plurality of pieces of input audio data IAD obtained as the sample data, the teacher vibration data obtaining section 52 obtains teacher vibration data TVD produced with the input audio data IAD as original data. That is, the teacher vibration data TVD is generated by performing various kinds of manipulation processing on an audio waveform included in the input audio data IAD obtained by the audio data obtaining section 51. By generating the vibration data on the basis of the waveform of the input audio data IAD, it is possible to generate a vibration waveform of contents interlocked with sound easily as compared with generation of the waveform of vibration from scratch. A plurality of sets of audio data and teacher vibration data are thereby obtained.

A producer of the vibration data manually specifies concrete contents such as the kind of manipulation processing at a time of generating the teacher vibration data TVD and the numerical values of parameters used for the manipulation processing. The producer, for example, generates desired vibration data by adjusting the contents of the manipulation processing while vibrating the vibrating device 16 on the basis of the vibration data after the manipulation processing is actually performed, and experiencing the contents thereof.

Specifically, for example, the teacher vibration data obtaining section 52 applies various kinds of filter processing such as low-pass filter processing for removing high-frequency components to the audio data according to the content of an instruction input by the producer with use of the operating device 14. In general, it is difficult to generate a high-frequency vibration by the vibrating device 16. Thus, the high-frequency components of the input audio data IAD can be removed by applying low-pass filter processing. In addition, the teacher vibration data obtaining section 52 may subject the input audio data IAD to the same kinds of manipulation processing as various kinds of signal processing applicable to audio data, such as pitch shift processing and equalization processing. In addition, manipulation processing that changes an envelope shape and manipulation processing that adds a given waveform (pulse wave or the like) may be performed.

Further, the producer generally applies a different kind of manipulation processing for each kind (category) of vibration desired to be generated. For example, as a vibration generated when a character performs an action such as hitting or stabbing an enemy by a weapon in a game, a particularly strong vibration is preferably generated in timing that is immediately after vibration generation. In addition, a vibration in a case of making contact with something is expected to exhibit a different tendency according to the material of the object with which the contact is made, such as metal, rubber, or wood. The producer produces the vibration data by changing the kind of filter to be applied or changing the content of manipulation processing for each time interval from a start to an end of the vibration or for each frequency or the like according to the kind of the vibration desired to be thus generated.

In addition, depending on the kind of the vibration desired to be generated, the producer may replace the vibration waveform itself with another waveform. Suppose that, for example, in a case where a vibration generated when metals come into contact with each other is desired to be reproduced, the vibration waveform is replaced with a sine wave of a specific frequency or the like. In this case, while a waveform is formed to coincide with the original audio data in terms of the length of the vibration (generation period), an envelope, and the like, the waveform shape of the teacher vibration data TVD is different from that of the original input audio data IAD.

Figure 3:
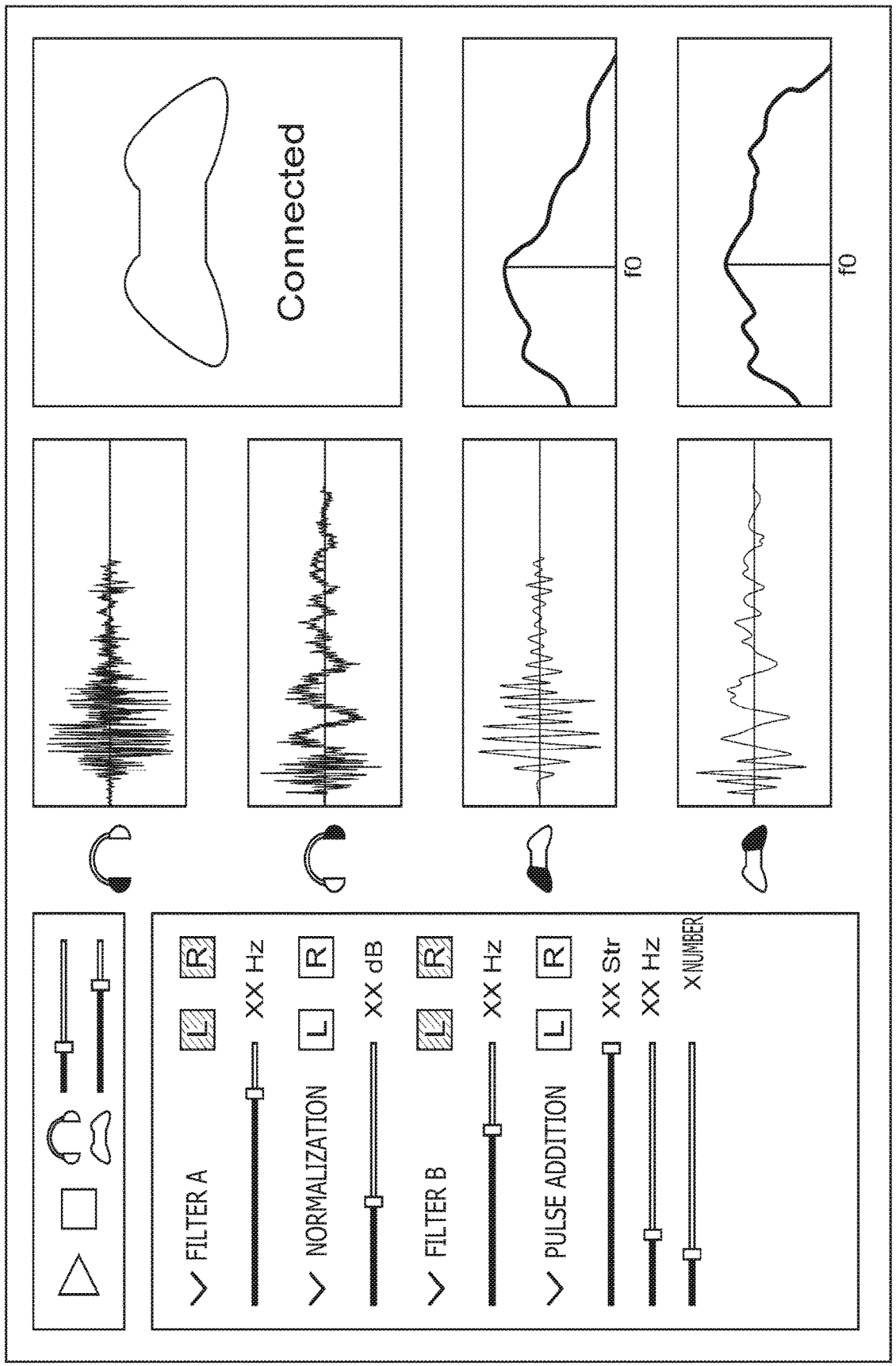
FIG. 3 is a diagram illustrating an example of a screen for producing teacher vibration data.

FIG. 3 illustrates an example of an editing screen for producing the teacher vibration data TVD. In this figure, an upper part of a center thereof illustrates the waveform of the input audio data IAD, and a lower part of the center thereof illustrates the produced teacher vibration data TVD. Incidentally, suppose that the input audio data IAD is stereo audio data, and two audio waveforms corresponding to two left and right channels are illustrated. In addition, suppose that the vibrating device 16 also includes two left and right vibrating mechanisms 16a, and that two vibration waveforms for respectively vibrating the left and right vibrating mechanisms 16a are produced on the basis of the audio waveforms of the two left and right channels. In addition, in the example of this figure, in correspondence with each vibration waveform, a frequency distribution (spectrum) obtained by frequency analysis to be described later is disposed so as to be adjacent on the right side of the vibration waveform. Further, in this frequency distribution, the position of a resonance frequency (f0) of the vibrating device 16 is indicated by a vertical line. Here, the resonance frequency of the vibrating device 16 corresponds to a frequency at which the vibrating device 16 vibrates at a maximum efficiency, and the intensity of vibration at this frequency is preferably increased. In addition, an upper right of the screen illustrates a connection state of the vibrating device 16.

In the screen example of FIG. 3, disposed on a left side is a control for specifying various kinds of manipulation processing applied to the input audio data IAD and parameters defining processing contents of the manipulation processing. When the producer specifies the various kinds of manipulation processing and the parameters by using this control, vibration waveforms obtained as a result of applying the manipulation processing to the audio waveforms in the upper part of the center are displayed in the lower part of the center. In addition, a control for giving an instruction to reproduce sound and vibration is disposed on the upper left of the screen. When the producer depresses a reproduction button, the sound is reproduced from a speaker, and the vibration corresponding to the vibration waveforms currently displayed is presented from the vibrating device 16. By using such a screen, the producer can produce vibration waveforms while trying out results of applying the various kinds of manipulation processing.

The machine learning section 53 performs machine learning using, as teacher data, a set of the teacher vibration data obtained by the teacher vibration data obtaining section 52 and the audio data used as the original data when the teacher vibration data is generated. This machine learning is learning for a conversion model for generating vibration data on the basis of the audio data.

Here, the algorithm of the machine learning performed by the machine learning section 53 may be various kinds of algorithms such, for example, as deep learning using a neural network and the like. A convolutional neural network (CNN) is particularly suitably used.

Figure 4:
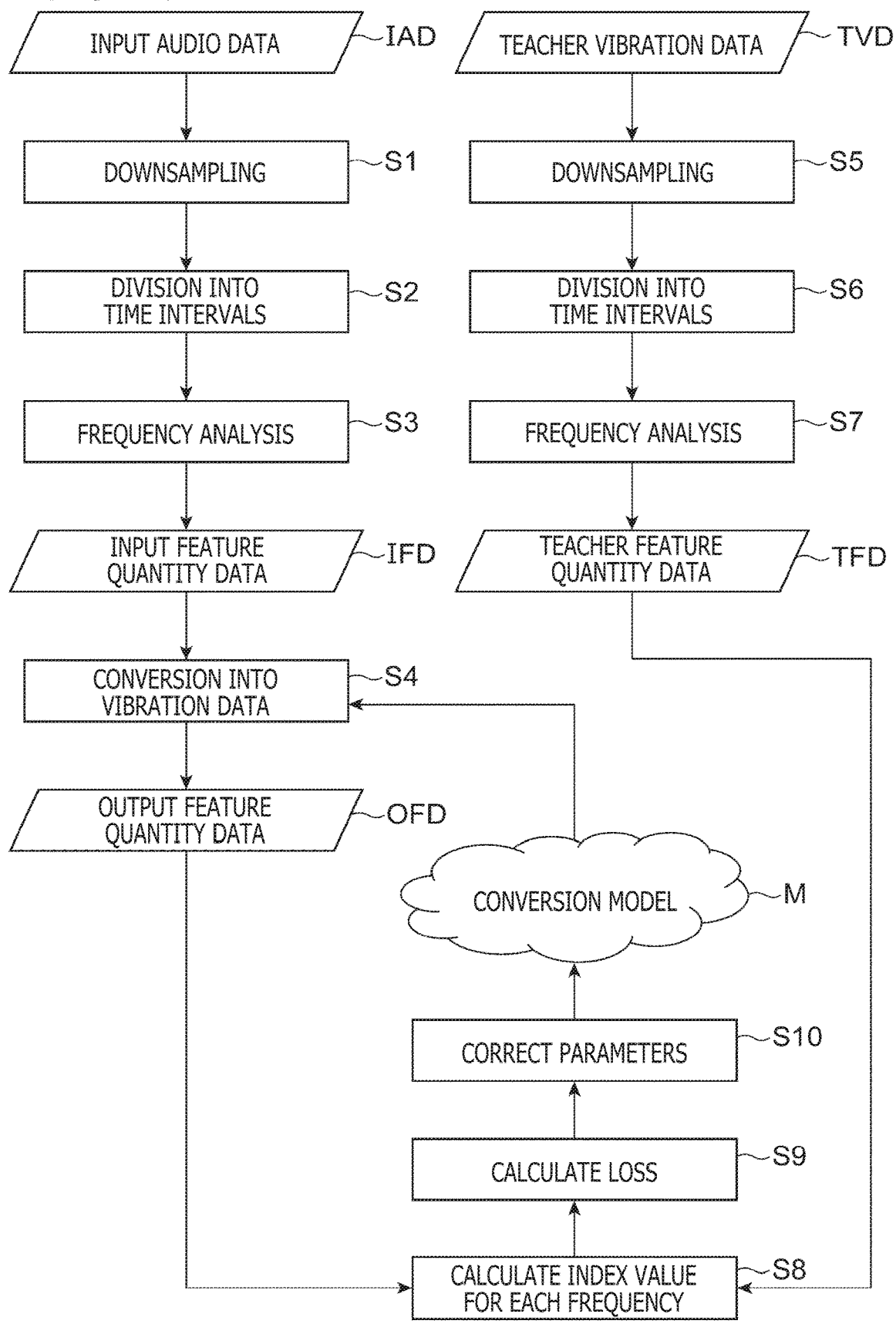
FIG. 4 is a data flowchart of assistance in explaining an example of machine learning processing.

A concrete example of processing performed by the machine learning section 53 will be described in the following with reference to a data flowchart of FIG. 4. FIG. 4 illustrates a flow of processing performed on one piece of input audio data IAD obtained by the audio data obtaining section 51 and teacher vibration data TVD generated on the basis of the input audio data IAD.

The machine learning section 53 first performs downsampling processing as preprocessing on the input audio data IAD (S1). Then, the input audio data IAD is divided into a plurality of time intervals (time windows) each having a predetermined length (S2). At this time, each time interval may partly overlap an adjacent time interval.

Thereafter, the machine learning section 53 calculates component values in a plurality of frequency bands, respectively, by performing frequency analysis of an audio waveform in each of the divided time intervals (S3). The audio waveform data is thereby converted into two-dimensional array data having one feature quantity for each of combinations of the time intervals and the frequency bands. In the following, the array data obtained by the frequency analysis will be referred to as input feature quantity data IFD.

Suppose in the following that, as a concrete example, the waveform of one certain piece of input audio data IAD is divided into n time intervals, and a feature quantity in each of m frequency bands is calculated for each of the time intervals. In this case, the waveform characteristics of the one piece of input audio data IAD are represented by n×m feature quantities. The input feature quantity data IFD is data having the n×m feature quantities as constituent elements thereof.

Methods for the frequency analysis include various kinds of methods such as a discrete cosine transform (DCT), and a fast Fourier transform (FFT). However, the fast Fourier transform is particularly preferably used. In a case where such a transform is performed, a window function such as a hann window may be applied to the waveform data before the transform. In addition, each feature quantity included in the input feature quantity data IFD may be a value itself of a result obtained by the fast Fourier transform or the like, or may be a numerical value indicating the magnitude of an amplitude obtained by converting the value of the result. Further, the numerical value indicating the magnitude of the amplitude may be a value expressed by a level expression using decibels or the like as units.

The machine learning section 53 inputs the n×m feature quantities included in the input feature quantity data IFD obtained by the preprocessing from S1 to S3 described above to a given conversion model M, and thereby converts the n×m feature quantities into vibration data (S4). This conversion model M is determined by the algorithm of the adopted machine learning and is constituted by a plurality of conversion parameters. In a neural network model constituted by a plurality of layers, for example, weight coefficients of the respective layers or the like are the conversion parameters.

In the following, the output data obtained by the conversion of S4 will be referred to as output feature quantity data OFD. As with the input feature quantity data IFD, the output feature quantity data OFD is constituted by n×m feature quantities. That is, the output feature quantity data OFD is constituted by the respective feature quantities in the same number of time intervals and the same number of frequency bands as in the input feature quantity data IFD.

Meanwhile, the machine learning section 53 also applies processing (S5 to S7) similar to the preprocessing (S1 to S3) on the input audio data IAD to the teacher vibration data TVD corresponding to the input audio data IAD, and thereby converts the teacher vibration data TVD into array data including n×m feature quantities (that is, respective feature quantities in the same number of time intervals and the same number of frequency bands as in the input feature quantity data IFD). In the following, the array data obtained by performing the frequency analysis of the teacher vibration data will be referred to as teacher feature quantity data TFD. Incidentally, as described earlier, the teacher vibration data TVD is vibration data from which high-frequency components are removed, and therefore frequency components of the teacher feature quantity data TFD which frequency components are equal to or higher than a predetermined threshold value are supposed to be values close to an amplitude of zero.

The machine learning section 53 repeats the machine learning while adjusting the values of the parameters constituting the conversion model M so as to reduce a difference between the output feature quantity data OFD and the teacher feature quantity data TFD obtained by the processing described above. At this time, the machine learning section 53, for example, uses a mean square error of the corresponding feature quantities or the like as an index value (loss) for evaluating the difference between the output data and the teacher feature quantity data. The smaller the calculated loss is, the more the output data obtained by the conversion model approaches the waveform of the teacher vibration data TVD manually produced by the producer.

Specifically, using the output feature quantity data OFD obtained in S4 and the teacher feature quantity data TFD obtained in S7, the machine learning section 53 first calculates index values (set as minimum square errors in this case) indicating differences between the output feature quantity data OFD and the teacher feature quantity data TFD at respective frequencies (S8). The machine learning section 53 next calculates a loss as a whole by averaging the index values calculated for the respective frequencies (S9). Thereafter, the machine learning section 53 corrects the parameters of the conversion model M so as to reduce the value of the loss calculated in S9 (S10), and repeats the machine learning.

Figure 5:
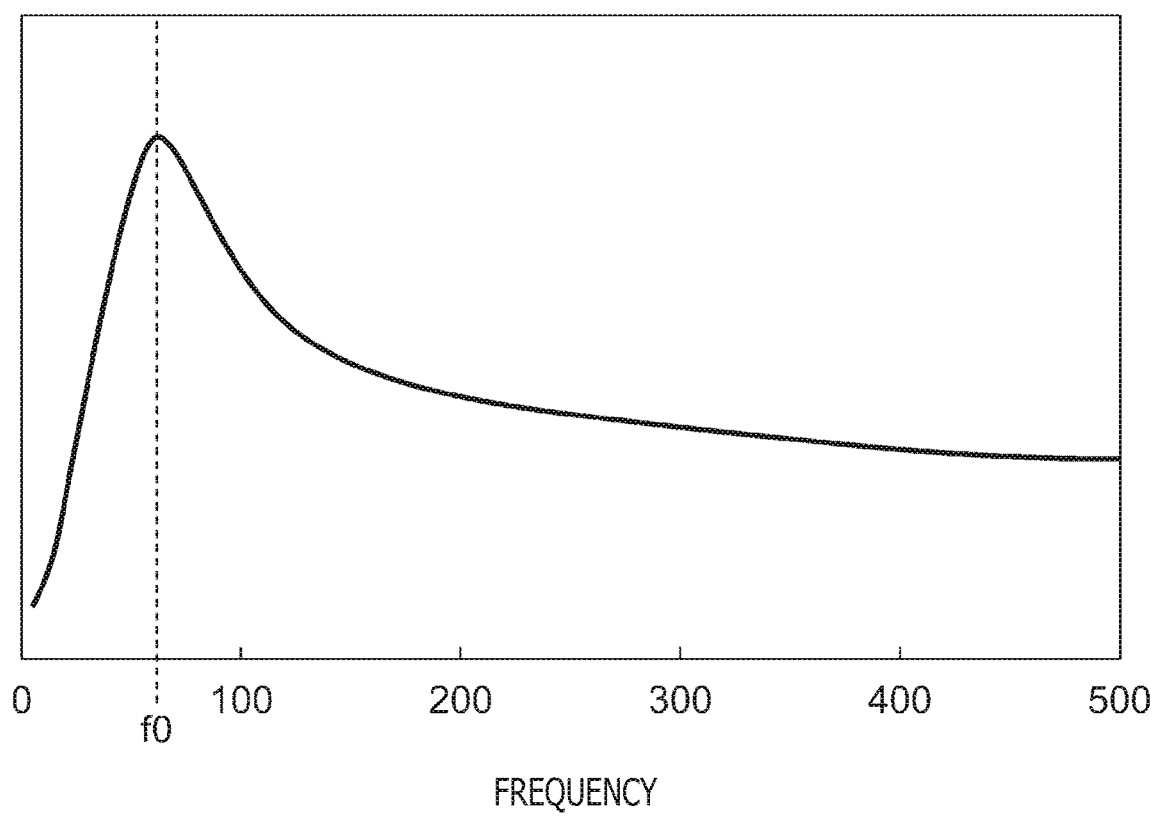
FIG. 5 is a diagram illustrating an example of a weighting function.

Incidentally, the machine learning section 53 may weight the index values indicating the differences at the respective frequencies calculated in S8 before calculating the loss in S9. The weighting makes it possible to attach more importance to feature quantities in a specific frequency band than feature quantities in the other frequency bands when the loss is evaluated. FIG. 5 is a diagram illustrating an example of a weighting function. A peak of the weighting function appears in a frequency band corresponding to the resonance frequency (f0) of the vibrating device 16 in this diagram. Incidentally, weighting amounts for the frequency bands other than that of the resonance frequency may also be determined according to the vibration characteristics of the vibrating device 16. By performing the weighting using such a weighting function, it is possible to adjust the conversion model M such that the closer to the resonance frequency a frequency band is, the more the value of the output feature quantity data OFD obtained by the conversion model M approaches the value of the teacher feature quantity data TFD in the frequency band.

A set of parameters ultimately obtained as a result of performing the processing of the machine learning as described above using a sufficient number of pieces of input data becomes learned model data constituting the conversion model M.

Figure 6:
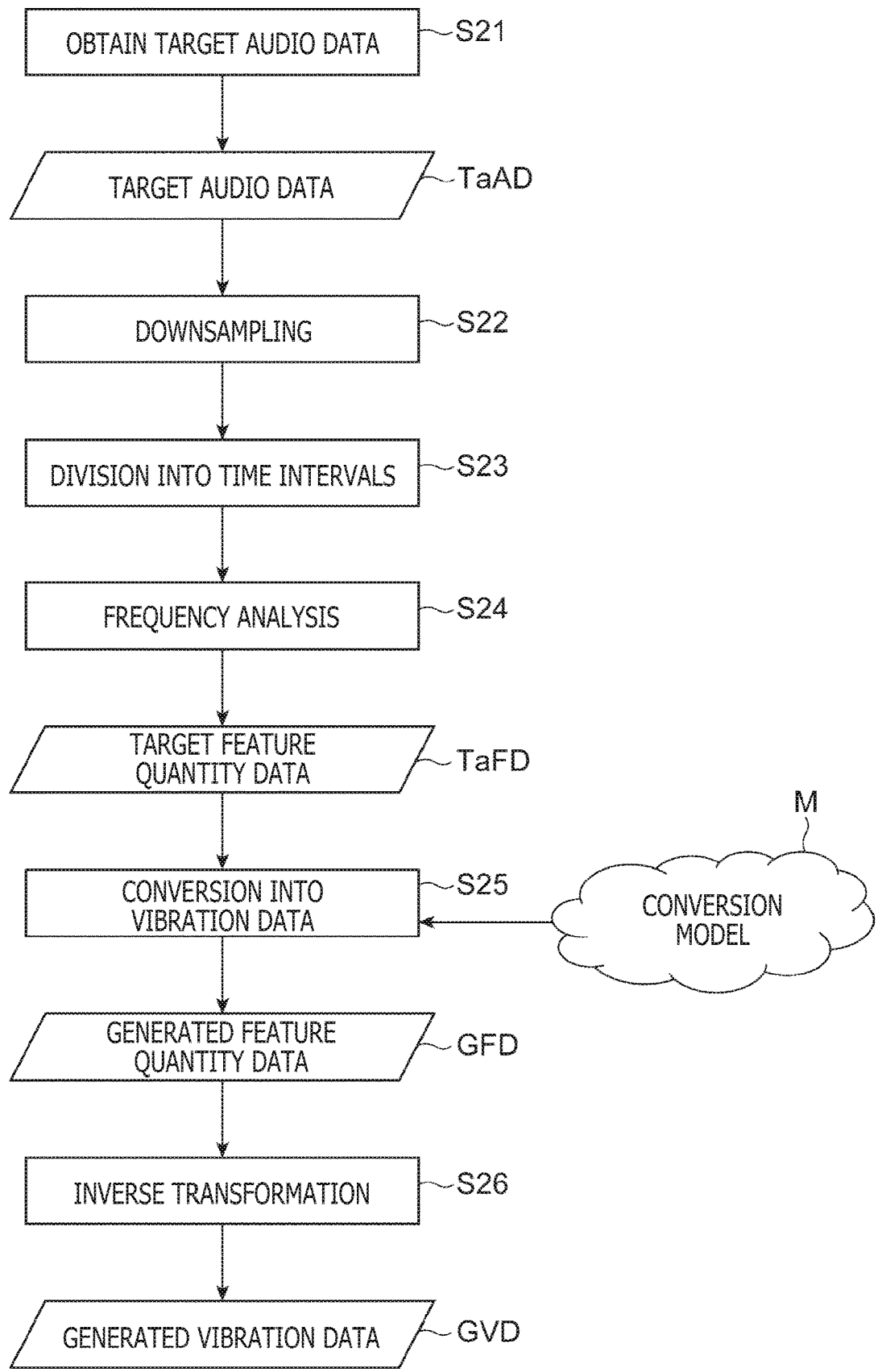
FIG. 6 is a data flowchart of assistance in explaining an example of vibration data generation processing.

The vibration data generating section 54 generates new vibration data by using the learned model data generated by the machine learning section 53. A concrete example of processing performed by the vibration data generating section 54 will be described in the following with reference to a data flowchart of FIG. 6.

First, the vibration data generating section 54 obtains new audio data different from the sample data used in the machine learning (which audio data will hereinafter be referred to as target audio data TaAD) (S21). Then, preprocessing (S22 to S24) similar to the preprocessing (S1 to S3) at the time of the machine learning is performed on the target audio data TaAD, and feature quantity data including n×m feature quantities (hereinafter referred to as target feature quantity data TaFD) is thereby calculated.

The vibration data generating section 54 calculates feature quantity data representing a new vibration waveform by inputting this target feature quantity data TaFD to the conversion model M constituted by the learned model data generated by the machine learning section 53 (S25). In the following, the post-conversion data obtained with the target feature quantity data TaFD as input will be referred to as generated feature quantity data GFD. Further, the vibration data generating section 54 applies a transform inverse from the frequency analysis performed in the preprocessing to the generated feature quantity data GFD (S26). Waveform data representing the vibration waveform corresponding to the target audio data TaAD is thereby obtained. Specifically, in a case where waveform data is converted into frequency components by performing a fast Fourier transform in the preprocessing, for example, waveform data in each time interval can be generated by applying an inverse Fourier transform to the generated feature quantity data GFD. When such waveform data in all time intervals is generated and combined, waveform data having the same length as the target audio data TaAD is obtained. In the following, the data of the vibration waveform obtained on the basis of the generated feature quantity data GFD will be referred to as generated vibration data GVD.

Incidentally, before the processing of S26, possibly performed is processing which reduces components in a specific frequency band in the generated feature quantity data GFD obtained in S25. Even when high frequency components are included in the generated vibration data GVD, it is difficult to make the vibrating device 16 generate vibration at such high frequencies, as described earlier. Accordingly, the generated vibration data GVD not including vibration at high frequencies can be generated by reducing the values of feature quantities of the high-frequency components included in the generated feature quantity data GFD in advance. Specifically, for example, for feature quantities in a frequency band equal to or higher than a predetermined threshold value (for example, 500 Hz) which feature quantities are included in the generated feature quantity data GFD obtained in S25, the vibration data generating section 54 replaces the values of the feature quantities indicating the amplitudes of components at the frequencies with a value close to zero (for example, −90 dB).

As described above, by using the learned model data generated by the machine learning section 53, the vibration data generating section 54 can output new generated vibration data GVD automatically without a need for the work of the producer.

Incidentally, the above description assumes that one piece of learned model data is generated by inputting all of the input audio data IAD to one conversion model M. However, the contents of the manipulation processing applied to the input audio data IAD by the producer are different depending on the category of vibration desired to be generated, as described earlier. Here, the category of vibration refers to a type of vibration (a vibration caused by an action such as hitting or stabbing, or a vibration of each material such as metal, rubber, or wood). Accordingly, the machine learning section 53 may generate learned model data of each category by performing the machine learning independently for each category. In this case, each piece of input audio data IAD is tagged with category information indicating a classification of vibration. The machine learning section 53 refers to the tag attached to each piece of input audio data IAD, and determines to which conversion model M to input the input audio data IAD among a plurality of conversion models M prepared for respective categories. The learned model data of the conversion models M independent for the respective categories is thereby obtained. The vibration data generating section 54 receives tagged target audio data TaAD. Then, the generated vibration data GVD is generated from the target audio data TaAD by using the conversion model M associated with the designated tag.

In addition, the above description assumes that the vibration waveform data itself produced by the producer is used as the teacher data, and that the output of the conversion model M is the feature quantity data including feature quantities in the respective time intervals and the respective frequency bands. However, without limitation to this, the teacher data may be data indicating the contents themselves of the manipulation processing performed when the producer produces the vibration data on the basis of the input audio data IAD. For example, in a case where the producer generates the vibration data by performing manipulation processing that adds a plurality of pulses to the head of the audio data, the number of pulses added is set as one of the feature quantities included in the teacher data. By performing the machine learning using such teacher data, it is possible to determine how many pulses are to be added to new target audio data TaAD by the machine learning. Incidentally, the parameter specified in the case where pulses are added is not limited to the number of pulses, and there can be cases where the producer also specifies positions at which the pulses are to be added, the frequency of the pulses to be added, and the like. In addition, also in a case where filter processing is applied, detailed contents of the filter are determined by various kinds of parameters. Suppose that in cases where various kinds of manipulation processing are thus performed, the machine learning is performed using the teacher data including, as feature quantities, parameters specifying the presence or absence of application of each piece of manipulation processing and the contents of the applied manipulation processing or the like. Kinds of manipulation processing to be applied to the target audio data TaAD and the parameters thereof can thereby be determined by the machine learning.

Further, the learning may be performed using a plurality of models according to the kinds of manipulation processing. In this case, the kind of manipulation processing to be learned is associated with each of the plurality of models. For each model, the machine learning section 53 performs the machine learning using the teacher vibration data TVD to which the manipulation processing of the kind associated with the model is applied.

As a concrete example, an example will be described in which manipulation processing (manipulation processing A) that applies filter processing such as a low-pass filter to the whole of the input audio data IAD and manipulation processing (manipulation processing B) that adds a plurality of pulses to a head part are learned independently of each other. The machine learning section 53 generates first learned model data by performing the above-described machine learning using the teacher vibration data TVD obtained by applying the manipulation processing A to the input audio data IAD (that is, data before the application of the manipulation processing B). Meanwhile, second learned model data for determining the number of pulses to be added is generated by performing the machine learning using the input audio data IAD as sample input data and using the number of pulses specified by the producer in the manipulation processing B as the teacher data.

The vibration data generating section 54 generates the generated vibration data GVD from the target audio data TaAD by using the first learned model data. Further, the number of pulses to be added is determined from the target audio data TaAD by using the second learned model data. Then, the determined number of pulses of a predetermined waveform shape are added to the generated vibration data GVD generated by using the first learned model data. Thus, the vibration data can be generated by using a result of performing the machine learning suitable for each kind of manipulation processing.

As described above, the information processing device 10 according to the present embodiment can automatically generate the vibration data by using the audio data and the teacher data manually produced by the producer.

It is to be noted that embodiments of the present invention are not limited to the embodiment described above. For example, while the above description assumes that one information processing device 10 performs both the machine learning and the vibration data generation processing using the learned model data, there is no limitation to this, and these pieces of processing may be implemented by information processing devices different from each other. In this case, the information processing device performing the machine learning provides the learned model data obtained as a result of the machine learning to the external information processing device by storing the learned model data on a computer readable information storage medium or distributing the learned model data via a communication network. The provided information processing device can implement the functions of the vibration data generating section 54 as described above by using the provided learned model data.

In addition, the contents of the machine learning performed by the machine learning section 53 are not limited to those described above either. Specifically, the data input to the conversion model M when the machine learning section 53 performs the machine learning and the kind and format of the data output by the conversion model M may be different from those described above. In addition, the algorithm (configuration of the conversion model M) itself of the machine learning may be different from that described above. In the following, description will be made of several modifications of contents of machine learning that can be adopted by the information processing device 10 according to the embodiment of the present invention. Incidentally, the information processing device 10 may perform the machine learning with contents adopted as a combination of some of these modifications.

As a first example, an example of feature quantity data added to the input data will be described. The above description assumes that the input feature quantity data IFD input to the conversion model M at the time of the machine learning is n×m feature quantities constituting a spectrogram obtained by performing the frequency analysis of the input audio data IAD. Here, n is the number of time intervals (frames) obtained by time division of the waveform of the input audio data IAD, and m is the number of frequency bands in which respective frequency components are calculated by the frequency analysis. In this first example, the machine learning section 53 may provide each of the feature quantities constituting the input feature quantity data IFD input to the conversion model M of a convolutional neural network with data indicating the position of the feature quantity.

The convolutional neural network is a robust method in terms of translation of the feature quantities included in the original data but tends not to attach importance to the positions of the feature quantities (at which positions the feature quantities are located in the whole). In the present embodiment, on the other hand, the input feature quantity data IFD having frequency bands as one of dimensions is used, and therefore differences between the frequency bands are important. For example, it is not desirable to equate vibration at the resonance frequency of the vibrating device 16 with vibration at another frequency. Accordingly, suppose that as one piece of preprocessing on the input data, the machine learning section 53 provides each of the feature quantities constituting the input feature quantity data IFD with data indicating the position coordinates of the feature quantity (that is, indicating the ordinal position of a time interval and the ordinal position of a frequency band). When the machine learning including the convolutional neural network is performed using the feature quantities thus provided with position coordinates as the input data, the machine learning can be performed in which consideration is given to not only the characteristics of the shape of the waveform but also what levels of vibration components are included in which frequency bands.

As a second example, the machine learning section 53 may use a method of generative adversarial networks (GANs) as an algorithm of the machine learning. Specifically, in addition to the conversion model M (corresponding to a generator in generative adversarial networks) that generates the vibration waveform described thus far, a discriminator which discriminates whether the waveform is generated by the generator or created manually by a person is prepared. The generator and the discriminator are made to learn in parallel with each other. Consequently, as the learning progresses, the generator becomes able to generate such a vibration waveform as cannot be discriminated by the discriminator (that is, as cannot be distinguished from the teacher data). The present embodiment has an objective of generating, by the machine learning, vibration data having characteristics close to those of the vibration data manually created by a person. Accordingly, vibration data that is difficult to distinguish from a real thing (vibration data manually produced by a person) can be generated by applying the method of generative adversarial networks.

As a third example, the output feature quantity data OFD output by the machine learning section 53 by the machine learning may be data including a combination of multiplying factors for amplifying or attenuating the feature quantities constituting the spectrogram of the original audio waveform and addition values to be added to the feature quantities, rather than the data constituting the spectrogram itself of the vibration waveform as described above.

In the present example, the input feature quantity data IFD is constituted by the n×m feature quantities corresponding to n time intervals and m frequency bands as in the foregoing description. On the other hand, suppose that the output feature quantity data OFD calculated by the conversion model M is not the n×m feature quantities constituting the spectrogram of the vibration data as described thus far but is constituted by two kinds of parameters (y1, y2) used to calculate each of these feature quantities. That is, the output feature quantity data OFD is formed by including n×m parameter sets each including two parameters, and includes n×m×2 parameters as a whole.

The contents of the spectrogram representing the vibration data are calculated on the basis of each feature quantity within the input feature quantity data IFD and the corresponding parameter set (y1, y2) within the output feature quantity data OFD. Specifically, suppose that a feature quantity in an ith time interval and a jth frequency band included in the input feature quantity data IFD is f(i, j), and that two parameters output by the conversion model M for the same time interval and the same frequency band are y1(i, j) and y2(i, j). In this case, an (i, j) component value s(i, j) of the spectrogram constituting the vibration waveform generated by the conversion model M is calculated by the following calculation equation.

$$s(i,j)=f(i,j)\cdot y1(i,j)+y2(i,j)$$

When this s(i, j) is calculated for all combinations of i=1, 2, . . . , n, and j=1, 2, . . . , m, n×m component values constituting the vibration waveform can be obtained as in the output feature quantity data OFD in the foregoing embodiment. Suppose that the machine learning section 53 performs the machine learning such that the vibration waveform represented by the n×m component values approaches the teacher vibration data TVD. In addition, the vibration data generating section 54 can generate the generated vibration data GVD by performing a calculation similar to that in the case of performing the machine learning described here on the basis of the generated feature quantity data GFD output by the conversion model M.

In a case where the producer manually produces the teacher vibration data TVD from the input audio data IAD, the producer performs production work by performing the equalization processing of strengthening or weakening vibration in a specific frequency band, the processing of adding a pulse waveform of a specific frequency, the processing of adding a pulse waveform attenuating at a specific frequency, the processing of adding an attenuating noise waveform, and the like, as described earlier. That is, the vibration waveform is produced by performing the processing of amplifying/attenuating the original waveform (processing of subjecting the original waveform to a multiplication change) and the processing of adding another waveform (processing of subjecting the original waveform to an addition change) independently of each other. In this third modification, for each of the component values included in the spectrogram constituting the vibration waveform, the conversion model M outputs two kinds of parameters, that is, the parameter y1 of a multiplying factor representing an effect amount of multiplication and the parameter y2 of an addition value representing an effect amount of addition. Thus, it is possible to generate the learned model data that can estimate a process of manual vibration data production by a person with higher accuracy.

As a fourth example, at a time of performing the machine learning, the machine learning section 53 may perform the machine learning using learning models to which random noise is added. In the present example, the machine learning section 53 outputs a plurality of kinds of output feature quantity data OFD by inputting one same input audio data IAD to each of a plurality of kinds of conversion models M obtained by adding a plurality of kinds of random noises different from each other. Then, the contents of the conversion model M are updated by using output feature quantity data OFD closest to the teacher feature quantity data TFD among the plurality of kinds of output feature quantity data OFD.

Figure 7:
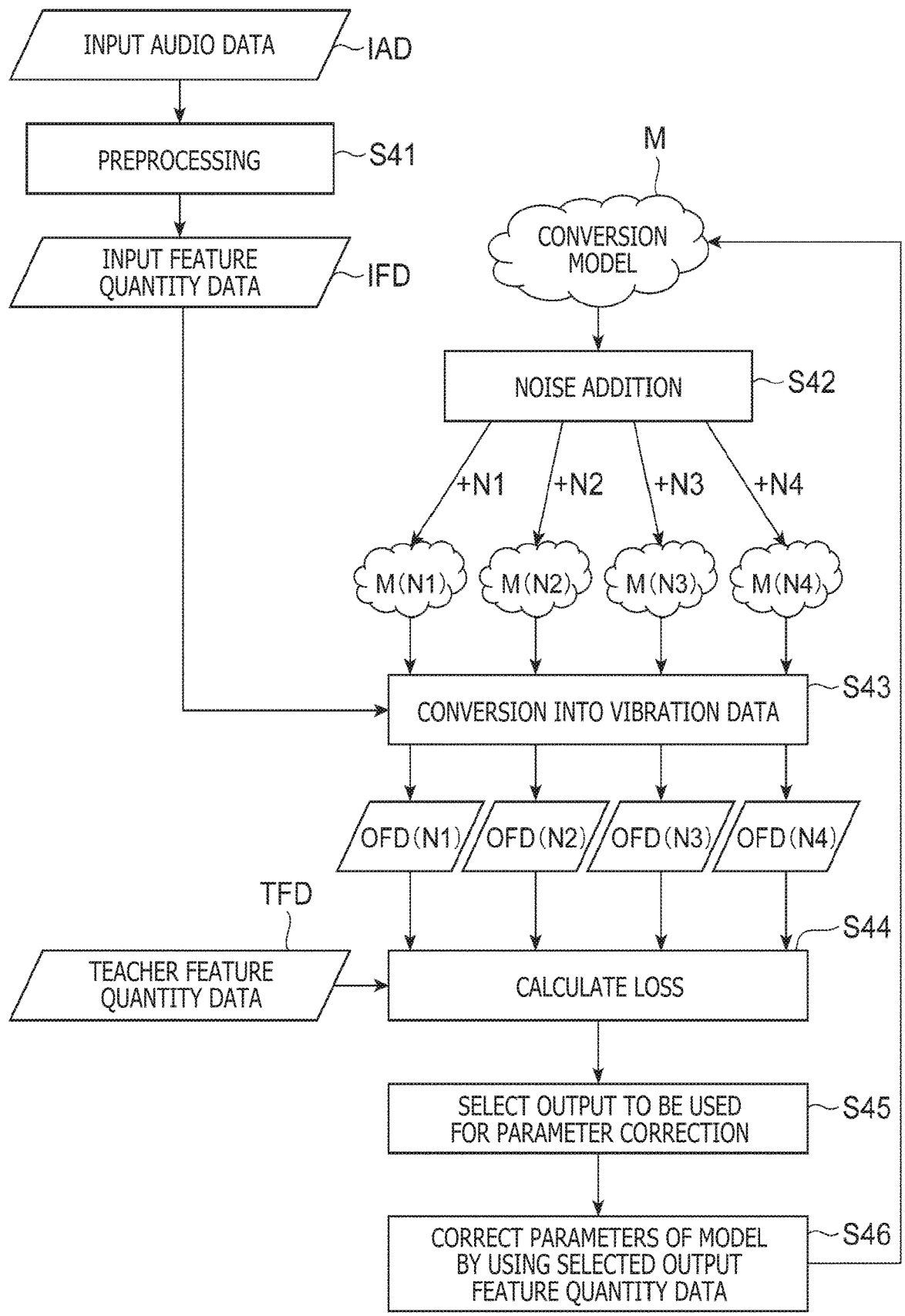
FIG. 7 is a data flowchart of assistance in explaining another example of the machine learning processing.

FIG. 7 is a data flowchart of assistance in explaining a flow of processing in this fourth example. In the example of this figure, the machine learning section 53 generates the input feature quantity data IFD by performing preprocessing similar to S1 to S3 in FIG. 4 on the basis of the input audio data IAD (S41). Then, four noise-added conversion models M(N1) to M(N4) are generated by adding four kinds of random noises N1 to N4 different from each other to the conversion model M (S42). Incidentally, a method such as Dropout, which randomly generates inactive nodes, can be adopted as a method for adding the noises to the conversion model M. Further, the machine learning section 53 generates four pieces of output feature quantity data OFD (N1) to OFD (N4) by inputting the same input feature quantity data IFD generated in S41 to each of these four noise-added conversion models M(N1) to M(N4) (S43). These pieces of output feature quantity data OFD represent vibration waveforms different from each other.

Next, the machine learning section 53 calculates a loss by comparing each of the four pieces of output feature quantity data OFD (N1) to OFD (N4) with the teacher feature quantity data TFD (S44). With the use of a result of the calculation, output feature quantity data OFD closest to the teacher feature quantity data TFD (that is, having a smallest loss) is selected (S45). Then, the parameters of the conversion model M are updated by using the selected one piece of output feature quantity data OFD (S46). The machine learning of the conversion model M is performed by repeating such control. Here, the other output feature quantity data OFD not selected in S45 is not used to update the conversion model M, and does not contribute to the learning.

In the present embodiment, the teacher data is vibration data manually produced by a person on the basis of audio data. Such vibration data reflects a tendency, an empirical rule, and the like of the producer, and thus there is no sole correct answer. Therefore, vibration waveforms of shapes different from each other may be produced for input audio data having a similar tendency. In such a case, when the machine learning is made to progress such that one model simply approaches the teacher data, there is a possibility of generating a model that outputs a vibration waveform of such contents obtained as if a plurality of pieces of teacher data with different characteristics are averaged. Accordingly, in the fourth example, the averaging can be expected to be avoided by making the machine learning proceed while adopting data from which an output closest to the teacher data is obtained among the conversion models to which the random noises different from each other are added. Incidentally, while it is assumed here that the machine learning is performed by using only the model that outputs one piece of output feature quantity data OFD closest to the teacher feature quantity data TFD, the machine learning may be performed by selectively using a part of the output feature quantity data OFD which part, for example, satisfies a given criterion, such as output feature quantity data OFD having a loss equal to or less than a reference value.

REFERENCE SIGNS LIST

10 Information processing device, 11 Control unit, 12 Storage unit, 13 Interface unit, 14 Operating device, 15 Display device, 16 Vibrating device, 51 Audio data obtaining section, 52 Teacher vibration data obtaining section, 53 Machine learning section, 54 Vibration data generating section

The invention claimed is:

1. An information processing device comprising:
   an audio data obtaining section configured to obtain audio data;
   a teacher vibration data obtaining section configured to obtain, as teacher vibration data, information regarding vibration data used to vibrate a vibrating device, the vibration data being produced on a basis of the audio data; and
   a machine learning section configured to perform machine learning using the audio data and the teacher vibration data as input, and generate learned model data used to convert an audio waveform into a vibration waveform.

2. The information processing device according to claim 1, wherein the machine learning section performs the machine learning using, as an input feature quantity, a component value in each of a plurality of frequency bands obtained by performing frequency analysis of the audio data.

3. The information processing device according to claim 2, wherein the machine learning section performs the machine learning using an input feature quantity obtained by adding, to the component value in each of the plurality of frequency bands, information regarding a position of the frequency band with respect to a whole.

4. The information processing device according to claim 2, wherein,
   for the component value in each of the plurality of frequency bands as the input feature quantity, the machine learning section outputs two kinds of feature quantities representing a multiplying factor and an addition value for the component value by the machine learning, and
   conversion from the audio waveform to the vibration waveform is performed by using the two kinds of feature quantities.

5. The information processing device according to claim 1, wherein
   the audio data obtaining section obtains tag information indicating kinds of vibration together with the audio data, and
   the machine learning section refers to the tag information and performs machine learnings independent of each other for the respective kinds of vibration, and generates a plurality of pieces of learned model data respectively associated with the kinds of vibration.

6. The information processing device according to claim 1, wherein
   the teacher vibration data obtaining section obtains information regarding teacher vibration data produced by applying a plurality of kinds of manipulation processing to the audio data, and the machine learning section performs a plurality of kinds of machine learning using, as teacher data, information regarding vibration data as a result of applying at least a part of the plurality of kinds of manipulation processing, respectively, and generates a plurality of pieces of learned model data respectively associated with the kinds of manipulation processing.

7. The information processing device according to claim 1, wherein the machine learning section generates a plurality of noise-added conversion models by adding a plurality of kinds of noises different from each other to a conversion model used to convert the audio waveform into the vibration waveform, and performs the machine learning selectively using a part of output feature quantity data close to the teacher vibration data among a plurality of pieces of output feature quantity data obtained by inputting the audio data to each of the plurality of noise-added conversion models.

8. An information processing method comprising:
obtaining audio data;
obtaining, as teacher vibration data, information regarding vibration data used to vibrate a vibrating device, the vibration data being produced on a basis of the audio data; and
performing machine learning using the audio data and the teacher vibration data as input, and generating learned model data used to convert an audio waveform into a vibration waveform.

9. A non-transitory, computer readable storage medium containing a computer program, which when executed by a computer, causes the computer to carry out actions, comprising:
obtaining audio data;
obtaining, as teacher vibration data, information regarding vibration data used to vibrate a vibrating device, the vibration data being produced on a basis of the audio data; and
performing machine learning using the audio data and the teacher vibration data as input, and generating learned model data used to convert an audio waveform into a vibration waveform.

10. A non-transitory, computer readable storage medium containing learned model data used to convert an audio waveform into a vibration waveform, the learned model data being obtained as a result of performing machine learning using audio data and teacher vibration data as input, the teacher vibration data being information regarding vibration data used to vibrate a vibrating device, the vibration data being produced on a basis of the audio data.

11. An information processing device comprising:
a target audio data obtaining section configured to obtain target audio data to be processed; and
a vibration data generating section configured to generate vibration data for vibrating a vibrating device by converting the target audio data into a vibration waveform by using learned model data obtained as a result of performing machine learning using audio data and teacher vibration data as input, the teacher vibration data being information regarding vibration data used to vibrate the vibrating device, the vibration data being produced on a basis of the audio data.

* * * * *